(12) United States Patent
Wu

(10) Patent No.: US 11,999,154 B2
(45) Date of Patent: Jun. 4, 2024

(54) PROCESS FOR MANUFACTURING DYNAMICALLY WARM-KEEPING GARMENT WITH ONE-WAY MOISTURE TRANSFERRING FUNCTION

(71) Applicant: Onewaydry Technology Development (Guangdong) Co., Ltd., Zhuhai (CN)

(72) Inventor: Ningxi Wu, Zhuhai (CN)

(73) Assignee: Onewaydry Technology Development (Guangdong) Co., Ltd., Zhuhai (CN)

( * ) Notice: Subject to any disclaimer, the term of this patent is extended or adjusted under 35 U.S.C. 154(b) by 171 days.

(21) Appl. No.: 17/883,786

(22) Filed: Aug. 9, 2022

(65) Prior Publication Data

US 2023/0115243 A1 Apr. 13, 2023

(30) Foreign Application Priority Data

Sep. 29, 2021 (CN) .......................... 202111151828.3

(51) Int. Cl.
*B32B 43/00* (2006.01)
*A41D 31/02* (2019.01)
(Continued)

(52) U.S. Cl.
CPC .............. *B32B 5/262* (2021.05); *A41D 31/02* (2013.01); *A41D 31/065* (2019.02); *B32B 5/024* (2013.01); *B32B 5/10* (2013.01); *B32B 7/09* (2019.01); *B32B 2250/20* (2013.01); *B32B 2250/40* (2013.01); *B32B 2262/0253* (2013.01); *B32B 2262/0261* (2013.01); *B32B 2262/0276* (2013.01); *B32B 2262/062* (2013.01); *B32B 2262/103* (2013.01); *B32B 2262/148* (2021.05); *B32B 2307/304* (2013.01); *B32B 2307/7265* (2013.01); *B32B 2437/00* (2013.01)

(58) Field of Classification Search
CPC .............. A41D 31/02; B32B 2262/062; B32B 2307/304; B32B 2307/21; A62C 99/0081
See application file for complete search history.

(56) References Cited

U.S. PATENT DOCUMENTS

| 2005/0102862 A1* | 5/2005 | Baychar .................... D04H 1/46 36/55 |
| 2008/0131648 A1* | 6/2008 | Baychar .................... B32B 3/26 428/90 |

(Continued)

FOREIGN PATENT DOCUMENTS

CN 105729918 A * 7/2016

*Primary Examiner* — Tajash D Patel
(74) *Attorney, Agent, or Firm* — Jeenam Park

(57) ABSTRACT

The invention provides a process for manufacturing a dynamically warm-keeping garment with a one-way moisture transferring function. The warm-keeping garment is made of a one-way moisture transferring fabric that includes a surface layer, a warm-keeping layer and a lining layer or includes the surface layer, a first warm-keeping layer, an intermediate interlayer, a second warm-keeping layer and the lining layer. The above technical solution addresses the following problems of traditional warm-keeping cotton clothes and down jackets: temperature loss caused by unsmooth sweat discharge; complex and difficult processing due to underarm zippers for ventilation; static damage and possible explosion of washing machines by air pressure due to air tightness during washing.

18 Claims, 3 Drawing Sheets

(51) Int. Cl.
*A41D 31/06* (2019.01)
*B32B 5/02* (2006.01)
*B32B 5/10* (2006.01)
*B32B 5/26* (2006.01)
*B32B 7/09* (2019.01)

(56) References Cited

U.S. PATENT DOCUMENTS

| | | | |
|---|---|---|---|
| 2010/0319113 A1* | 12/2010 | Rock | B32B 5/26 |
| | | | 2/457 |
| 2017/0203540 A1* | 7/2017 | Colatruglio | A41D 31/102 |
| 2020/0315273 A1* | 10/2020 | Thompson | A41D 31/125 |

* cited by examiner

PROCESS FOR MANUFACTURING DYNAMICALLY WARM-KEEPING GARMENT WITH ONE-WAY MOISTURE TRANSFERRING FUNCTION

CROSS-REFERENCE TO RELATED APPLICATIONS

This is a U.S. patent application which claims the priority and benefit of Chinese Patent Application Number 202111151828.3, filed on Sept. 29, 2021, the disclosure of which is incorporated herein by reference in its entirety.

TECHNICAL FIELD

The invention relates to the technical field of textile processing, and in particular to a process for manufacturing a dynamically warm-keeping garment with a one-way moisture transferring function.

BACKGROUND

In people's daily life or outdoor sports, sweat excreted by the body will be absorbed by fabrics. After clothes made of ordinary fabrics absorb sweat, plant fibers will expand and block fabric holes, so that the sweat and the fabrics stick to the human skin, and the sweat cannot be quickly discharged and evaporated.

One-way moisture transfer of a fabric means that moisture or sweat flows from an inner fabric layer to an outer fabric layer, and evaporates and diffuses in the outer fabric layer, while it is difficult for the moisture or sweat in the outer fabric layer to seep back into the inner fabric layer. The mechanism of one-way moisture transfer of a fabric is the capillary effect due to a pressure difference. Under the action of the capillary effect and the pressure difference, liquid moisture in the fabric diffuses automatically from an inner layer to an outer layer.

There are currently two ways to achieve one-way moisture transfer of a fabric in theory: one way is to increase a diffusion rate at the fabric surface and increase an evaporation area for sweat or moisture; and the other way is to increase the capillary effect of the fabric, that is, the capillary effect is enhanced by increasing capillary channels. In this way, the adhesion between the fabric and human skin can be reduced, and comfort can be improved. In practice, it is also a commonly used means to provide some manually controlled windows for clothes in the form of zippers and so on to achieve the purpose of heat dissipation and moisture removal.

In the prior art, the patent application for the utility model with publication number CN211868813U, titled "One-way Moisture Transferring Fabric", discloses a one-way moisture transferring fabric. The fabric sequentially includes a lining layer, a middle layer and an outer layer from inside to outside, where the lining layer is formed by weaving modified moisture transferring yarns, the middle layer is formed by weaving composite yarns in a twill weave manner, the outer layer is formed by weaving flame-retardant yarns in a plain weave manner, and the flame-retardant yarns are formed by twisting aromatic amide fibers. In the technical solution, the one-way moisture transferring fabric has a three-layer structure, and flame-retardant yarns are also used to achieve the flame-retardant effect.

The invention patent application with publication number CN113322559A, titled "Method for Manufacturing Knitted Fabric with Moisture Absorption, Quick Drying and One-Way Moisture Transferring Functions", specifically discloses a method for manufacturing a knitted fabric with moisture absorption, quick drying and one-way moisture transferring functions. The method includes the following steps: S1. removing impurities from cotton fibers, soaking the cotton fibers in a hydrophilic agent for hydrophilic treatment, taking out and drying the treated cotton fibers, and spinning the cotton fibers to obtain hydrophilic cotton yarns; S2. removing the impurities from the cotton fibers, soaking the cotton fibers in a hydrophobic agent for hydrophobic treatment, taking out and drying the treated cotton fibers, and spinning the cotton fibers to obtain hydrophobic cotton yarns; blending the hydrophilic cotton yarns and water-soluble fibers to obtain mixed cotton yarns, where the blending ratio of the hydrophilic cotton yarns to the water-soluble fibers is 1: (0.3-0.4); S3. blending the mixed cotton yarns and the hydrophobic cotton yarns at a ratio of 1:1 to obtain a mixed fabric; spinning the hydrophilic cotton yarns to obtain a hydrophilic fabric, and sewing the hydrophilic fabric and the mixed fabric to obtain a moisture transferring fabric; and S4. placing the moisture transferring fabric in a cleaning tank, and stirring and cleaning to obtain a finished fabric. The fabric manufactured by the method of this application can be used for making clothes with one-way moisture permeability. In the technical solution, the hydrophilic fabric is sewn with the mixed fabric to obtain the moisture transferring fabric; and the mixed fabric is obtained by blending the mixed cotton yarns and the hydrophobic cotton yarns.

In the prior art, another way is to choose a fabric with a polyester (polyester fiber) material as the main component (60-100%). Then, in a finishing stage, the material is coated on the surface of the fabric through liquid additives, and a small amount of the material penetrates the surface of the fabric, so as to achieve the effect of one-way moisture transfer. In this way, the fabric has moisture transferring effect through the coating of additives. The actual controllability of this function is unstable, so that the effect of the one-way moisture transferring function is inconsistent. In addition, because this is a production process of coating on the surface of the fabric, the one-way moisture transferring function will lose gradually after garments made of the fabric are worn and washed.

The application with publication number CN102048245B discloses a one-way moisture transferring quick-drying comfortable fabric and manufacture method therefor. The one-way moisture transferring quick-drying comfortable fabric includes a hydrophilic base cloth and a plurality of hydrophobic patterns, where the hydrophilic base cloth is provided with an inner surface and an outer surface, the plurality of hydrophobic patterns are embedded in the inner surface, the hydrophilic base cloth includes fiber materials, the hydrophobic patterns are constructed to ensure that the hydrophilic base cloth absorbs sweat on the inner surface through the capillary action and the sweat is conveyed to the outer surface. The manufacture method for the easily dyed fiber product of the invention includes the step of embedding the plurality of hydrophobic patterns on an inner surface of the hydrophilic base cloth, where the hydrophilic base cloth includes the fiber materials and the hydrophobic patterns are constructed to ensure that the hydrophilic base cloth absorbs sweat on the inner surface through the capillary action and the sweat is conveyed to the outer surface. The technical solution attempts to achieve the purpose of one-way moisture transfer by means of textile patterns.

In addition, traditional warm-keeping cotton clothes and down jackets have some problems, such as large electrostatic friction, tedious machine washing, complicated processing flow, and poor moisture transfer of lining and fabric. Therefore, it is of practical significance to effectively solve the problems of moisture transfer and static electricity for warm-keeping cotton clothes and down jackets.

SUMMARY

To overcome the shortcomings of the prior art, an objective of the invention is to provide a process for manufacturing a dynamically warm-keeping garment with a one-way moisture transferring function, so as to solve the problem of temperature loss caused by unsmooth sweat discharge after sweating of traditional warm-keeping cotton clothes and down jackets; solve the problem that processing is complex and difficult due to the fact that underarm zippers are formed for ventilation of the traditional warm-keeping cotton clothes and down jackets; and completely solve the problems that traditional warm-keeping cotton clothes and down jackets are prone to generating electrostatic damage, and a washing machine is prone to being exploded by air pressure due to air tightness during machine washing of the traditional warm-keeping cotton clothes and down jackets.

The process for manufacturing a dynamically warm-keeping garment with a one-way moisture transferring function according to the invention is achieved by the following technical solution.

According to the technical solution of the invention, the dynamically warm-keeping garment is made of a one-way moisture transferring fabric, the one-way moisture transferring fabric includes three layers of materials, and specifically includes a surface layer, a warm-keeping layer and a lining layer;

where the surface layer needs to be made of a one-way moisture transferring woven fabric featured by a single-layer double-density structure, with a surface structure made of any cotton, polyester, nylon yarns or yarns; and a lining structure made of polypropylene yarns: or parallel spandex covered yarns; or polyester, nylon yarns, or parallel spandex covered yarn modified by a hydrophobic agent. As a single-layer fabric woven with a double-laver structure, this fabric has a physical one-way moisture transferring effect, has no special requirements for traditional processing and cutting, and also has physical antibacterial properties if the lining structure is polypropylene.

The warm-keeping layer can be made of cotton puffed cotton clusters, polyester fiber puffed chemical fiber clusters, or duck down and goose down clusters:

Furthermore, during filling and processing, blocky nonwoven fabrics are attached to the front and back sides of a filler, and down clusters of natural creatures are processed into bags for penetration resistance.

The lining layer is the same as the surface layer: furthermore, metal conductive yarns are spaced at an interval of 2-5 cm in a weft direction of the lining layer to weaken high voltage electrostatic mass caused by friction between the chemical fiber material and the human body.

Furthermore, according to the technical solution of the invention, the surface layer needs to be made of a one-way moisture transferring woven fabric not less than 45 d, and the fabric is featured by a single-layer double-density structure, with a surface structure made of any cotton, polyester, nylon fdy yarns or dty yarns, and a lining structure made of 45-75 d dty polypropylene yarns or parallel 20 d spandex covered yarns, or 45-75 d polyester, nylon dty yarns or parallel 20 d spandex covered yarns modified by a hydrophobic agent.

In addition, in a second embodiment of the technical solution of the invention, the dynamically warm-keeping garment made of a one-way moisture transferring fabric has five layers, including a surface layer, a first warm-keeping layer, an intermediate interlayer, a second warm-keeping layer and a lining layer.

In addition, in a specific embodiment of the processing method according to the technical solution of the invention, there are strict requirements for processing sequences of the surface fabric. First, the one-way moisture transferring surface fabric must be clearly marked with front and back sides to avoid loss of the above functionality of a processed finished product caused by errors in operation on a work table. Because the fabric has a single-layer double-density structure, the front and back sides may be in the same color when a chemical hydrophobic agent is used. In this case, the front side may be easily confused with the back side during processing, resulting in loss of the functionality of the finished product. If a fabric with a lining made of polypropylene yarns is used, the front and back sides have a large color difference, making it easy to distinguish between the two colors of the single layer.

In a specific embodiment of the processing method, an intermediate warm-keeping filler only needs to be processed as a traditional warm-keeping filler without distinguishing between the front and back sides.

In a specific embodiment of the processing method, there are same strict requirements for processing sequences of the one-way moisture transferring lining fabric as for the surface fabric, otherwise the finished product will not have the above functionality after processing.

In a specific embodiment of the processing method, the one-way moisture transferring surface fabric and the antistatic one-way moisture transferring lining fabric that are marked with front and back sides are cut on a cutting table, then the intermediate warm-keeping filler is sewn with the one-way moisture transferring lining fabric, in which a lining part of the one-way moisture transferring lining fabric must face the human body.

Compared with the prior art, the technical solution of the invention has the following beneficial effects:

1. The invention can completely solve the problem that traditional warm-keeping garments are impermeable to air and moisture. To improve down penetration resistance of fillers, all fabrics of traditional warm-keeping garments are high-density or ultra-high-density woven fabrics, and these fabrics have extremely poor moisture permeability. A finished product made by the method of the invention has a real-time dynamic one-way moisture transferring, air-permeable and moisture-permeable effect based on the principle that the one-way moisture transferring fabric has a one-way moisture absorption function. With the constant temperature of the human body and a large temperature difference with the ambient environment, hot moisture produced by the human body is constantly squeezed from the lining layer to the surface layer in real time for sublimation and volatilization. When passing through the intermediate filler, most of heat emitted by the human body is stored in the intermediate filler, which greatly reduces heat loss while ensuring air permeability, so that the human body is always kept in a warm and dry state close to the constant body temperature under heavy exercise in any outdoor cold environment.

2. The invention can completely solve the problem that traditional warm-keeping garment products cannot resist static electricity. With the one-way moisture transferring lining fabric made of weft yarns and parallel metal conductive filaments, the garment has a sufficient anti-static effect on high-voltage static electricity caused by friction between the human body and the garment in addition to a dynamic one-way moisture transferring function, so as to avoid the damage of electrostatic mass to the human body and the occurrence of unforeseen safety accidents caused by static electricity in winter.
3. The invention can completely solve the problems of moisture accumulation caused by poor moisture removal of traditional warm-keeping garment products, and the need for additional design of underarm ventilation windows or chest ventilation windows. Because the finished product has real-time dynamic moisture removal and warm-keeping functions, it is unnecessary to design any additional ventilation windows, thereby reducing processing steps, reducing processing cost and improving processing rate.
4. The invention can completely solve the problem of bulkiness and puffiness of traditional warm-keeping garments. Because the garment has a real-time dynamic one-way moisture transferring function, and does not require additional ventilation windows, the finished product has the characteristics of light weight, warming-keeping, air permeability and the like. The real-time dynamic one-way moisture transferring function also reduces the requirements for a CLO value (calorific value) of the intermediate filler, and a calibrated warm-keeping temperature range remains unchanged, so that in a test with a body filled with 200 g/M2, sleeves filled with 120 g/M2 and a hood filled with 120 G/M2 under force 6 wind at −10-−15° C., only one T-shirt is needed to withstand the wind, snow and cold weather, which greatly reduces dress burden of the human body.
5. The invention completely solves the problem that traditional warm-keeping garments are difficult to clean. Warm-keeping garments made by such method can be machine washed, dehydrated and air-dried at will without worrying about an instantaneous explosion by air pressure during machine washing due to air impermeability of fabrics.

To make the objectives and technical solutions in the specific embodiments of the invention clearer, the following clearly and completely describes the technical solutions in the specific embodiments of the invention with reference to examples of the specific embodiments of the invention. Apparently, the described specific embodiments are some but not all of specific embodiments of the invention. Based on the described specific embodiments of the invention, all other specific embodiments obtained by those of ordinary skill in the art without creative work should fall within the protection scope of the invention.

REFERENCE NUMERALS IN THE DRAWINGS

1 Surface layer; 2 Warm-keeping layer; 3 Lining layer;
21 First warm-keeping layer; 22 Second warm-keeping layer; 4 Intermediate interlayer

DETAILED DESCRIPTION

The technical solutions of the invention will be further described with reference to specific embodiments below. In a specific embodiment of the technical solution of the invention, a light dynamically warm-keeping garment with a one-way moisture transferring function and a heavy dynamically warm-keeping garment with a one-way moisture transferring function are manufactured depending on different warm-keeping needs, and processing methods for the two garments are not exactly the same.

Figure 1:
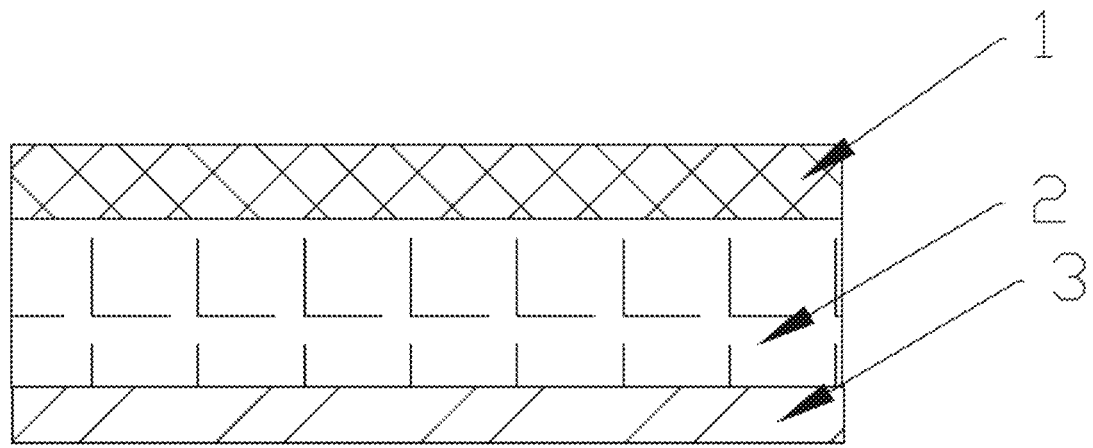
FIG. 1 is a sectional view of a one-way moisture transferring fabric with a three-layer structure according to the invention.

Embodiment 1 Manufacture of Light Dynamically Warm-Keeping Garment with One-Way Moisture Transferring Function FIG. 1 is a sectional view of a one-way moisture transferring fabric with a three-layer structure according to the invention, and the one-way moisture transferring fabric is used to make the light dynamically warm-keeping garment with a one-way moisture transferring function. As shown in FIG. 1, the one-way moisture transferring fabric includes a surface layer 1, a warm-keeping layer 2 and a lining layer 3; the surface layer 1 serves as an outer fabric of the light dynamically warm-keeping garment with a one-way moisture transferring function, and the lining layer 3 serves as an inner fabric of the light dynamically warm-keeping garment with a one-way moisture transferring function; and the warm-keeping layer 2 is located between the surface layer 1 and the lining layer 3.

In the embodiment, the surface layer 1 is made of a 90 d one-way moisture transferring woven fabric featured by a single-layer double-density structure, with a surface structure made of nylon fdy yarns or dty yarns; and a lining structure made of nylon dty yarns and parallel 20 d spandex covered yarns.

Figure 3:
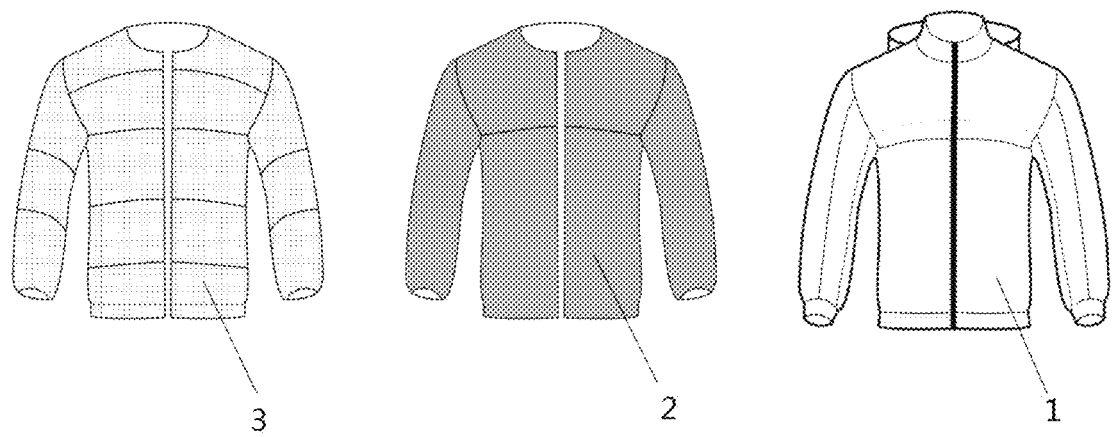
FIG. 3 is a schematic diagram of a three-layer structure of a dynamically warm-keeping garment according to the invention.

The warm-keeping layer 2 is made of duck down and goose down clusters processed into bags for penetration resistance;

The lining layer 3 differs from the surface layer 1 in that metal conductive yarns are spaced at an interval of 5 cm in a weft direction of the lining layer 3 to weaken high voltage static electricity caused by friction between the chemical fiber material and the human body. FIG. 3 is a schematic diagram of a three-layer structure of a dynamically warm-keeping garment according to the invention. The formed three-layer structure of the light dynamically warm-keeping garment with a one-way moisture transferring function is shown, which specifically includes a surface layer 1, a warm-keeping layer 2 and a lining layer 3.

In the embodiment, a whole piece of quilted cotton with a size of 80-160 g/M2 serves as a warm-keeping layer 2 of a body part of the light-weight dynamically warm-keeping garment with a one-way moisture transferring function and is sewn with the lining layer 3 made of a one-way moisture transferring anti-static fabric, the lining layer 3 and the warm-keeping layer 2 made of warm-keeping filling block materials are sewn through an equal-interval facial suture, sleeve parts and the body part of the warm-keeping garment are made by using the same method, and a hood, if any, of the light dynamically warm-keeping garment with a one-way moisture transferring function is made by using the same method as the body part. Front pockets and sleeve pockets do not need to be filled with a warm-keeping layer 2.

Embodiment 2 Manufacture of Light Dynamically Warm-Keeping Garment with One-Way Moisture Transferring Function The method and steps are the same as those in Embodiment 1, except that the surface layer 1 has a surface structure made of polyester yarns; and a lining structure made of a 75 d dty polyester and polypropylene/nylon and polypropylene fabric.

The warm-keeping layer 2 is made of polyester fiber puffed chemical fiber clusters; and the lining layer 3 differs from the surface layer 1 in that metal conductive yarns are spaced at an interval of 2 cm in a weft direction of the lining layer 3.

Figure 2:
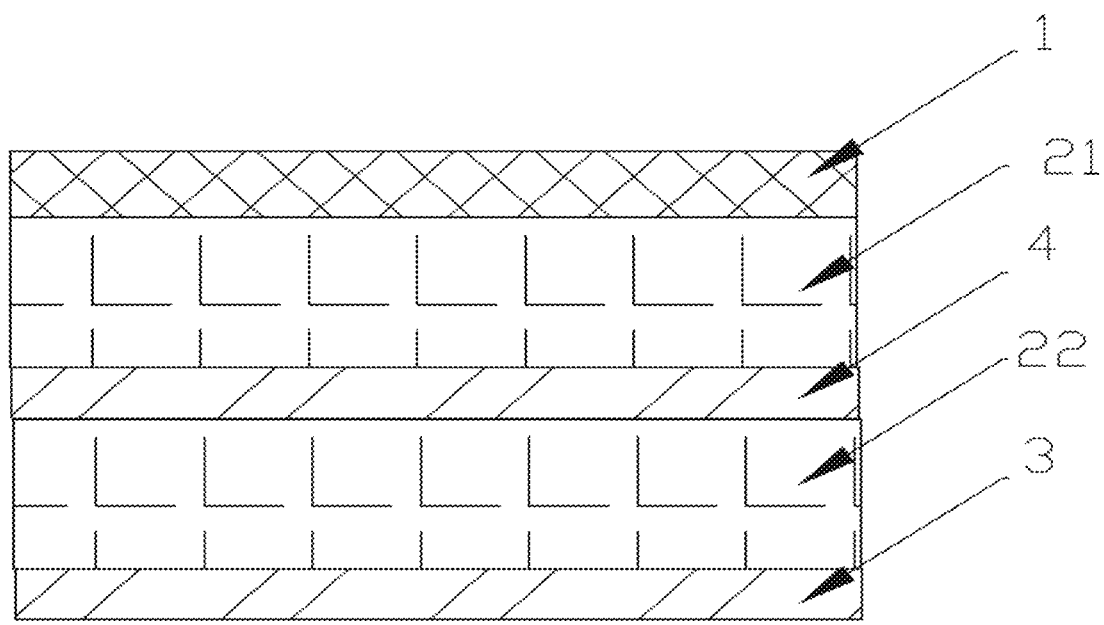
FIG. 2 is a sectional view of a one-way moisture transferring fabric with a five-layer structure according to the invention.

Embodiment 3 Manufacture of Heavy Dynamically Warm-Keeping Garment with One-Way Moisture Transferring Function FIG. 2 is a sectional view of a one-way moisture transferring fabric with a five-layer structure according to the invention, and the one-way moisture transferring fabric is used to make the heavy dynamically warm-keeping garment with a one-way moisture transferring function. As shown in FIG. 2, the one-way moisture transferring fabric includes a surface layer 1, a first warm-keeping layer 21, an intermediate interlayer 4, a second warm-keeping layer 22 and a lining layer 3; the surface layer 1 serves as an outer fabric of the heavy dynamically warm-keeping garment with a one-way moisture transferring function, and the lining layer 3 serves as an inner fabric of the heavy dynamically warm-keeping garment with a one-way moisture transferring function; where the first warm-keeping layer 21 is located between the surface layer 1 and the intermediate interlayer 4; the second warm-keeping layer 22 is located between the intermediate interlayer 4 and the lining layer 3; and the intermediate interlayer 4 is located between the first warm-keeping layer 21 and the second warm-keeping layer 22 to separate the first warm-keeping layer 21 from the second warm-keeping layer 22.

In the embodiment, the surface layer 1 is made of a 75 d one-way moisture transferring woven fabric, with a surface structure made of nylon fdy yarns; and a lining structure made of polyester modified by a hydrophobic agent.

Quilted cotton with a size of 120 g/M2 serves as the first warm-keeping layer 21, and a whole piece of quilted cotton with a size of 80 g/M2 serves as the second warm-keeping layer 22.

Figure 4:
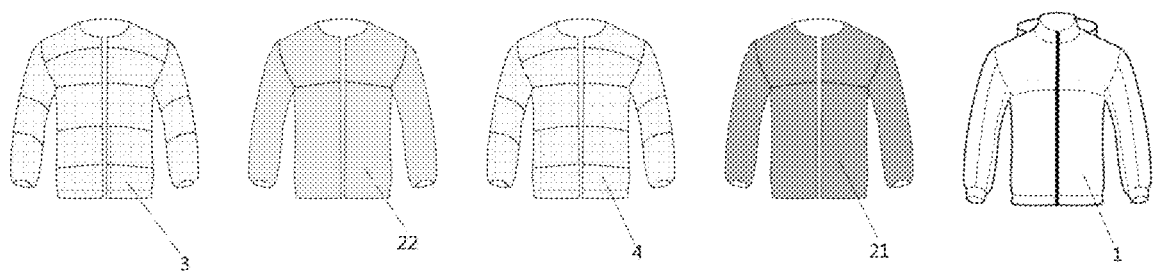
FIG. 4 is a schematic diagram of a five-layer structure of a dynamically warm-keeping garment according to the invention.
Figure 5:
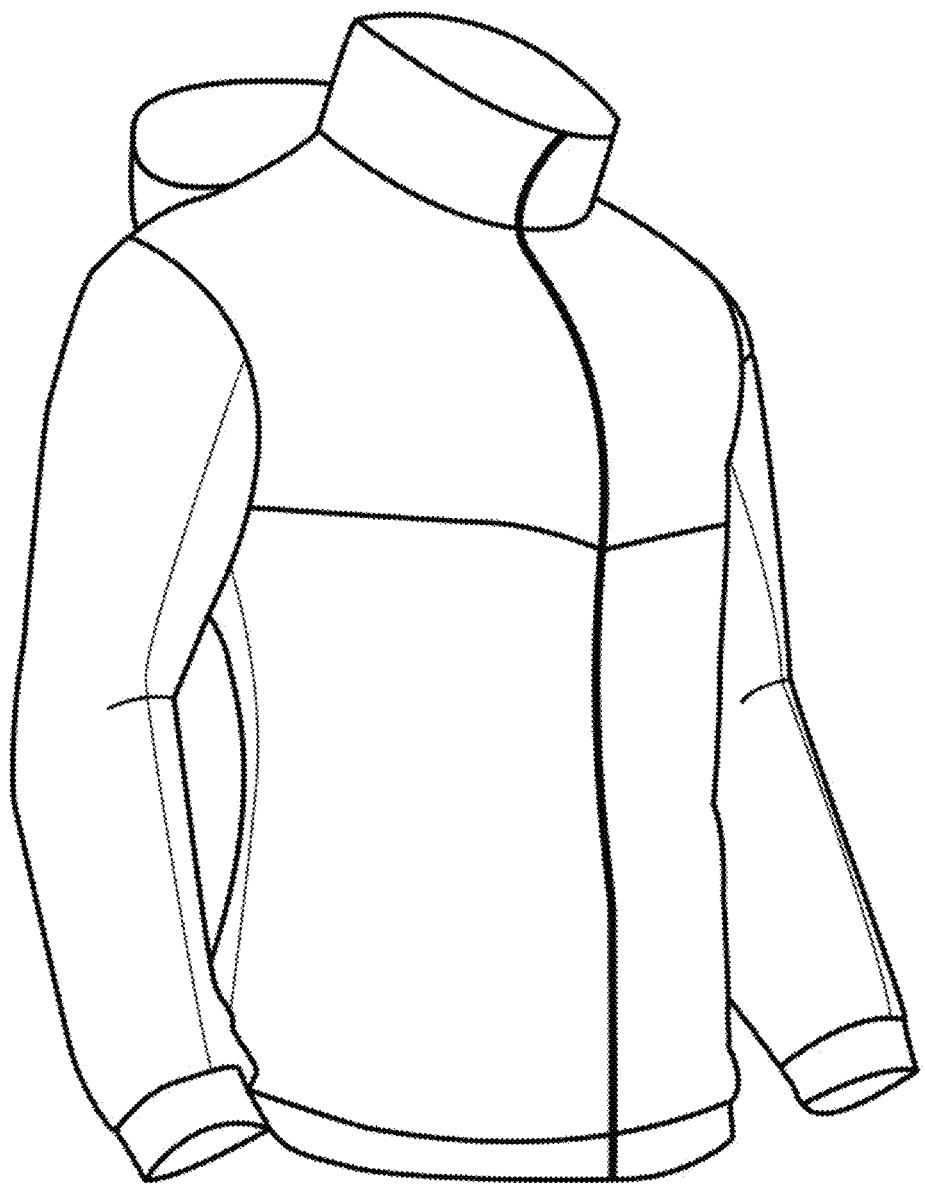
FIG. 5 is a three-dimensional schematic diagram of a dynamically warm-keeping garment according to the invention.

The lining layer 3 differs from the surface layer 1 in that metal conductive yarns are spaced at an interval of 5 cm in a weft direction of the lining layer 3 to weaken high voltage static electricity caused by friction between the chemical fiber material and the human body. FIG. 4 is a schematic diagram of a five-layer structure of a dynamically warm-keeping garment according to the invention. The formed five-layer structure of the heavy dynamically warm-keeping garment with a one-way moisture transferring function is shown, which specifically includes a surface layer 1, a first warm-keeping layer 21, an intermediate interlayer 4, a second warm-keeping layer 22 and a lining layer 3.

In Embodiment 3, a front body part (chest part) of the heavy dynamically warm-keeping garment with a one-way moisture transferring function has a whole piece of quilted cotton with a size of 80 g/M2 as the second warm-keeping layer 22. The second warm-keeping layer 22 is wrapped and sewn between the lining layer 3 and the intermediate interlayer 4 of the one-way moisture transferring anti-static fabric, and the lining layer 3 and the second warm-keeping layer 22 are sewn through an equal-interval facial suture. Then, on the basis of the sewn front warm-keeping piece, the first warm-keeping layer 21 with a size of 160 g/M2 is inserted, sewn with the sewn front semi-finished product, and then sewn with the surface layer 1 into a whole piece of front finished product through the equal-interval facial suture.

Sleeve parts can be sewn by the method described in Embodiment 1, and a hood, if any, is made by using the same method as the sleeve parts. Front pockets and sleeve pockets do not need to be filled with a warm-keeping filler.

For the surface layer 1, the first warm-keeping layer 21, the intermediate interlayer 4, the second warm-keeping layer 22 and the lining layer 3 as shown in FIG. 4, when the first warm-keeping layer 21 and the second warm-keeping layer 22 are sewn with the lining layer 3 of the one-way moisture transferring fabric into a semi-finished product, orientation of the front and back sides of the fabric must be strictly checked, with the side with anti-static yarns facing the human body, then the fabric of the surface layer 1 is sewn, and the back side of the fabric of the surface layer 1 must face the human body like the fabric of the lining layer 3.

As shown in FIG. 4, when the first warm-keeping layer 21 and the second warm-keeping layer 22 of an intermediate warm-keeping filler are sewn with the intermediate interlayer 4 and the lining layer 3 of the one-way moisture transferring fabric into a semi-finished product with a sandwich structure, orientation of the front and back sides of the fabric with the sandwich structure must be strictly checked, with the side with anti-static yarns facing the human body, then the surface layer 1 of the surface fabric is sewn, and the back side of the surface layer 1 must face the human body like the fabric of the lining layer 3.

Embodiment 4 Manufacture of Heavy Dynamically Warm-Keeping Garment with One-Way Moisture Transferring Function The method and steps are the same as those in Embodiment 3, except that:

the surface layer 1 has a surface structure made of cotton yarns; and a lining structure made of nylon dty yarns and parallel 20 d spandex covered yarns.

The first warm-keeping layer 21 is made of polyester fiber puffed chemical fiber clusters:

the second warm-keeping layer 22 is made of cotton puffed cotton clusters; and the lining layer 3 differs from the surface layer 1 in that metal conductive yarns are spaced at an interval of 3 cm in a weft direction of the lining layer 3.

All fabrics facing the human body are mainly single-layer double-density one-way moisture transferring woven fabrics. Among the single-layer double-density fabrics, if a polypropylene fabric is used as a base, the polypropylene fabric must face the human body. If a chemically modified one-way moisture transferring woven fabric is used as a base, the fabric needs to be marked with front and back sides facing the human body. The invention can only be achieved by using woven fabrics, and knitted fabrics cannot be down penetration resistant due to organizational structures, so it is of little significance.

Embodiment 5

The thermal resistance, CLO values, thermal conductivity and air permeability of the products in Embodiments 1 to 4 were measured by standard methods described in GB/T 11048-2018 and GB/T 5453-1997 respectively. Results are as follows:

| Test indexes | Test method | Sample 1 | Sample 2 | Sample 3 | Sample 4 |
|---|---|---|---|---|---|
| Thermal resistance | GB/T 11048-2018 | 0.43 | 0.418 | 0.62 | 0.60 |
| CLO value | GB/T 11048-2018 | 2.78 | 2.74 | 3.56 | 3.42 |
| Converted warm-keeping rate | GB/T 11048-2018 | 94 | 89 | 98.6 | 97.8 |
| Thermal conductivity | GB/T 11048-2018 | 0.0293 | 0.0298 | 0.0105 | 0.0110 |
| Air permeability | GB/T 5453-1997 | 39 | 42 | 31 | 32 |

Both GB/T 11048-2018 and GB/T 5453-1997 are the latest national standards.

This measurement was entrusted to a third-party testing organization.

The samples 1 to 4 are corresponding to the products in Embodiments 1 to 4 respectively; the sample 1 and the sample 2 are the light dynamically warm-keeping garments with a one-way moisture transferring function as described in Embodiment 1 and Embodiment 2; the sample 3 and the sample 4 are the heavy dynamically warm-keeping garments with a one-way moisture transferring function as described in Embodiment 3 and Embodiment 4; the sample 1 and the sample 2 are M-sized ready-to-wear garments, with a filler content of 198-200 g; and the sample 3 and the sample 4 are M-sized ready-to-wear garments, with a filler content of 248-250 g.

Generally, a 200 g men's short down jacket with 90% goose down/700-800 fill power can resist about 10° ° C. cold for someone sitting still, that is, the CLO value is about 2.3;

As light dynamically warm-keeping garments with a one-way moisture transferring function, the sample 1 and the sample 2 have CLO values of 2.78 and 2.74, respectively, that is, compared with the above-mentioned men's short down jacket with 90% duck down, the CLO values of the sample 1 and the sample 2 with the same filler content are increased by 20.8% and 19.1% respectively, and thus the sample 1 and the sample 2 are superior to the men's short down jacket with 90% duck down. The sample 1 and the sample 2 are suitable for daily use at −15° C. to 10° C., and are less filled than traditional warm-keeping cotton clothes in the same warm-keeping temperature range.

As heavy dynamically warm-keeping garments with a one-way moisture transferring function, the sample 3 and the sample 4 have CLO values of 3.56 and 3.42, respectively, that is, compared with the above-mentioned men's short down jacket with 90% duck down, the CLO values of the sample 3 and the sample 4 are increased by 54.8% and 48.7% respectively. The sample 3 and the sample 4 are more suitable for use at an ambient temperature of −30° ° C. to −10° C., and are less filled than traditional warm-keeping cotton clothes in the same warm-keeping temperature range.

It is clear from the above data that, compared with the light dynamically warm-keeping garment samples with a one-way moisture transferring function, the heavy dynamically warm-keeping garment samples with a one-way moisture transferring function have lower thermal conductivity, higher relative warm-keeping rate and lower air permeability, because the heavy dynamically warm-keeping garments with a one-way moisture transferring function are additionally provided with an intermediate interlayer 4 and a second warm-keeping layer 22, so that the results are as expected.

The specific examples of the technical solution of the invention have been further described above with reference to the specific embodiments. The specific embodiments are intended to describe the technical solution in detail, but not intended to limit the technical solution. The foregoing specific embodiments only describe preferred embodiments of the invention, but do not limit the technical concept and protection scope of the invention. Various modifications and improvements made by those of ordinary skill in the art to the technical solution should fall into the protection scope of the invention, without departing from the design concept of the invention.

What is claimed is:

1. A process for manufacturing a dynamically warm-keeping garment with a one-way moisture transferring function, wherein the dynamically warm-keeping garment is made of a one-way moisture transferring fabric, the one-way moisture transferring fabric comprises three layers of materials, and specifically comprises a surface layer, a warm-keeping layer and a lining layer; a whole piece of quilted cotton with a size of 80-160 g/M2 serves as the warm-keeping layer of a body part of the light dynamically warm-keeping garment with a one-way moisture transferring function and is sewn with the lining layer made of a one-way moisture transferring anti-static fabric, the lining layer and the warm-keeping layer made of warm-keeping filling block materials are sewn through an equal-interval facial suture, sleeve parts and the body part of the warm-keeping garment are made by using a same method, the same method refers to that the whole piece of quilted cotton with a size of 80-160 g/M2 serves as the warm-keeping layer of the sleeve parts of the light dynamically warm-keeping garment with the one-way moisture transferring function and is sewn with the lining layer made of the one-way moisture transferring anti-static fabric, the lining layer and the warm-keeping layer made of warm-keeping filling block materials are sewn through the equal-interval facial suture, and front pockets and sleeve pockets do not need to be filled with a warm-keeping layer.

2. The process for manufacturing a dynamically warm-keeping garment with a one-way moisture transferring function according to claim 1, wherein the surface layer needs to be made of a one-way moisture transferring woven fabric featured by a single-layer double-density structure, with a surface structure made of any cotton, polyester, nylon yarns or yarns; and a lining structure made of polypropylene yarns; or parallel spandex covered yarns; or polyester, nylon yarns, or parallel spandex covered yarns modified by a hydrophobic agent.

3. The process for manufacturing a dynamically warm-keeping garment with a one-way moisture transferring function according to claim 1, wherein the warm-keeping layer is made of cotton puffed cotton clusters, polyester fiber puffed chemical fiber clusters, or duck down and goose down clusters.

4. The process for manufacturing a dynamically warm-keeping garment with a one-way moisture transferring function according to claim 1, wherein the lining layer is the same as the surface layer.

5. The process for manufacturing a dynamically warm-keeping garment with a one-way moisture transferring function according to claim 4, wherein metal conductive yarns are spaced at an interval of 2-5 cm in a weft direction of the lining layer.

6. The process for manufacturing a dynamically warm-keeping garment with a one-way moisture transferring function according to claim 2, wherein the surface layer is made of a one-way moisture transferring woven fabric not less than 45 d, and the fabric is featured by a single-layer double-density structure, with a surface structure made of any cotton, polyester, nylon fdy yarns or dty yarns, and a lining structure made of 45-75 d dty polypropylene yarns or parallel 20 d spandex covered yarns, or 45-75 d polyester, nylon dty yarns or parallel 20 d spandex covered yarns modified by a hydrophobic agent.

7. The process for manufacturing a dynamically warm-keeping garment with a one-way moisture transferring function according to claim 3, wherein the surface layer is made of a one-way moisture transferring woven fabric not less than 45 d, and the fabric is featured by a single-layer double-density structure, with a surface structure made of any cotton, polyester, nylon fdy yarns or dty yarns, and a lining structure made of 45-75 d dty polypropylene yarns or parallel 20 d spandex covered yarns, or 45-75 d polyester, nylon dty yarns or parallel 20 d spandex covered yarns modified by a hydrophobic agent.

8. The process for manufacturing a dynamically warm-keeping garment with a one-way moisture transferring function according to claim 4, wherein the surface layer is made of a one-way moisture transferring woven fabric not less than 45 d, and the fabric is featured by a single-layer double-density structure, with a surface structure made of any cotton, polyester, nylon fdy yarns or dty yarns, and a lining structure made of 45-75 d dty polypropylene yarns or parallel 20 d spandex covered yarns, or 45-75 d polyester, nylon dty yarns or parallel 20 d spandex covered yarns modified by a hydrophobic agent.

9. The process for manufacturing a dynamically warm-keeping garment with a one-way moisture transferring function according to claim 5, wherein the surface layer is made of a one-way moisture transferring woven fabric not less than 45 d, and the fabric is featured by a single-layer double-density structure, with a surface structure made of any cotton, polyester, nylon fdy yarns or dty yarns, and a lining structure made of 45-75 d dty polypropylene yarns or parallel 20 d spandex covered yarns, or 45-75 d polyester, nylon dty yarns or parallel 20 d spandex covered yarns modified by a hydrophobic agent.

10. The process for manufacturing a dynamically warm-keeping garment with a one-way moisture transferring function according to claim 1, wherein the one-way moisture transferring fabric has five layers, including a surface layer, a first warm-keeping layer, an intermediate interlayer, a second warm-keeping layer and a lining layer.

11. The process for manufacturing a dynamically warm-keeping garment with a one-way moisture transferring function according to claim 10, wherein the surface layer, the intermediate interlayer and the lining layer are made of a one-way moisture transferring fabric.

12. The process for manufacturing a dynamically warm-keeping garment with a one-way moisture transferring function according to claim 10, wherein the first warm-keeping layer and the second warm-keeping layer are made of the same warm-keeping material.

13. The process for manufacturing a dynamically warm-keeping garment with a one-way moisture transferring function according to claim 10, wherein the surface layer needs to be made of a one-way moisture transferring woven fabric featured by a single-layer double-density structure, with a surface structure made of any cotton, polyester, nylon yarns or yarns; and a lining structure made of polypropylene yarns; or parallel spandex covered yarns; or polyester, nylon yarns, or parallel spandex covered yarns modified by a hydrophobic agent.

14. The process for manufacturing a dynamically warm-keeping garment with a one-way moisture transferring function according to claim 13, wherein the surface layer is made of a one-way moisture transferring woven fabric not less than 45 d, and the fabric is featured by a single-layer double-density structure, with a surface structure made of any cotton, polyester, nylon fdy yarns or dty yarns, and a lining structure made of 45-75 d dty polypropylene yarns or parallel 20 d spandex covered yarns, or 45-75 d polyester, nylon dty yarns or parallel 20 d spandex covered yarns modified by a hydrophobic agent.

15. The process for manufacturing a dynamically warm-keeping garment with a one-way moisture transferring function according to claim 13, wherein the lining layer and the intermediate interlayer are the same as the surface layer.

16. The process for manufacturing a dynamically warm-keeping garment with a one-way moisture transferring function according to claim 13, wherein metal conductive yarns are spaced at an interval of 2-5 cm in a weft direction of the lining layer.

17. The process for manufacturing a dynamically warm-keeping garment with a one-way moisture transferring function according to claim 1, wherein during filling and processing, blocky non-woven fabrics are attached to the front and back sides of a filler, and down clusters of natural creatures are processed into bags for penetration resistance.

18. The process for manufacturing a dynamically warm-keeping garment with a one-way moisture transferring function according to claim 1, wherein the one-way moisture transferring fabric is a quick-drying one-way moisture transferring fabric.

* * * * *